United States Patent
Sakai et al.

(10) Patent No.: US 9,461,532 B2
(45) Date of Patent: Oct. 4, 2016

(54) RESISTANCE GENERATING DEVICE FOR DRIVE UNIT

(71) Applicant: Aisin Seiki Kabushiki Kaisha, Kariya-shi (JP)

(72) Inventors: Toshiyuki Sakai, Kariya (JP); Ryusei Suzuki, Chiryu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/578,917

(22) Filed: Dec. 22, 2014

(65) Prior Publication Data

US 2015/0222169 A1    Aug. 6, 2015

(30) Foreign Application Priority Data

Jan. 31, 2014  (JP) .................................. 2014-017518

(51) Int. Cl.
| | |
|---|---|
| *F16F 15/03* | (2006.01) |
| *H02K 49/10* | (2006.01) |
| *E05F 15/622* | (2015.01) |
| *H02K 49/06* | (2006.01) |

(Continued)

(52) U.S. Cl.
CPC ............ *H02K 49/106* (2013.01); *E05F 15/622* (2015.01); *F16D 63/008* (2013.01); *H02K 49/06* (2013.01); *H02K 49/10* (2013.01); *E05Y 2900/546* (2013.01); *F16D 2127/005* (2013.01); *H02K 2213/09* (2013.01)

(58) Field of Classification Search
CPC .......... F16D 2127/005; H02K 49/043; H02K 49/106; F16F 15/03
USPC .......................................................... 188/267
See application file for complete search history.

(56) References Cited

U.S. PATENT DOCUMENTS

| | | | |
|---|---|---|---|
| 4,601,438 A | * | 7/1986 | Young ........................... 242/289 |
| 5,944,149 A | | 8/1999 | Kuwahara |

(Continued)

FOREIGN PATENT DOCUMENTS

| | | |
|---|---|---|
| DE | 10 2009 039 658 A1 | 3/2011 |
| EP | 0 828 339 A2 | 3/1998 |

(Continued)

OTHER PUBLICATIONS

Extended European Search Report issued on Oct. 22, 2015 in Patent Application No. 14199584.5.

*Primary Examiner* — Thomas J Williams
(74) *Attorney, Agent, or Firm* — Oblon, McClelland, Maier & Neustadt, L.L.P.

(57) ABSTRACT

A resistance generating device for a drive unit of an opening and closing member of a vehicle includes a transmission member transmitting a rotary motion to a rotary body, and a fixing member provided to form a clearance between the fixing member and the transmission member in a radial direction of a rotary axis of the transmission member. One of the fixing member and the transmission member includes a magnet and the other includes a magnetic body. The magnet is disposed to face the magnetic body so that the facing position facing each other is changed as the transmission member rotates. The magnet is disposed to face the magnetic body so that magnetic poles at the facing position alternate as the transmission member rotates. The magnetic body and the magnet generate a magnetic force therebetween, the magnetic force generating a resistance against an opening and closing movement of the opening and closing member.

6 Claims, 15 Drawing Sheets

(51) Int. Cl.
*F16D 63/00* (2006.01)
*F16D 127/00* (2012.01)

(56) References Cited

U.S. PATENT DOCUMENTS

| | | |
|---|---|---|
| 6,794,778 B1 | 9/2004 | Walker et al. |
| 2009/0000201 A1 | 1/2009 | Fahl |
| 2014/0083226 A1 | 3/2014 | Sakai |
| 2014/0224045 A1 | 8/2014 | Kummer |
| 2015/0222168 A1* | 8/2015 | Sakai ............................ 310/93 |

FOREIGN PATENT DOCUMENTS

| | | |
|---|---|---|
| EP | 1940012 A1 * | 7/2008 |
| EP | 2 192 675 A1 | 6/2010 |
| EP | 2 543 808 A1 | 1/2013 |
| FR | 2 830 893 A1 | 4/2003 |
| JP | 2005-265174 | 9/2005 |
| JP | 4885910 | 2/2012 |

* cited by examiner

FIG. 2A
FIG. 2B
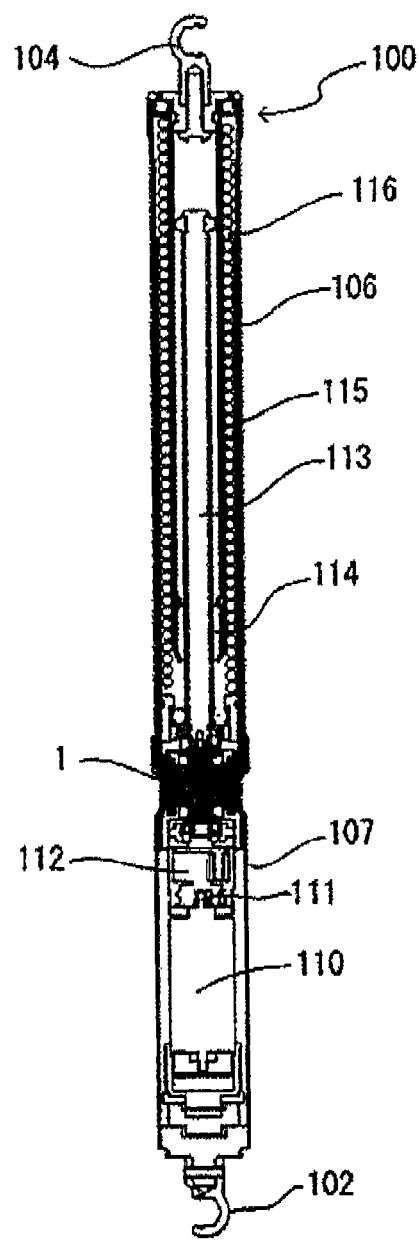
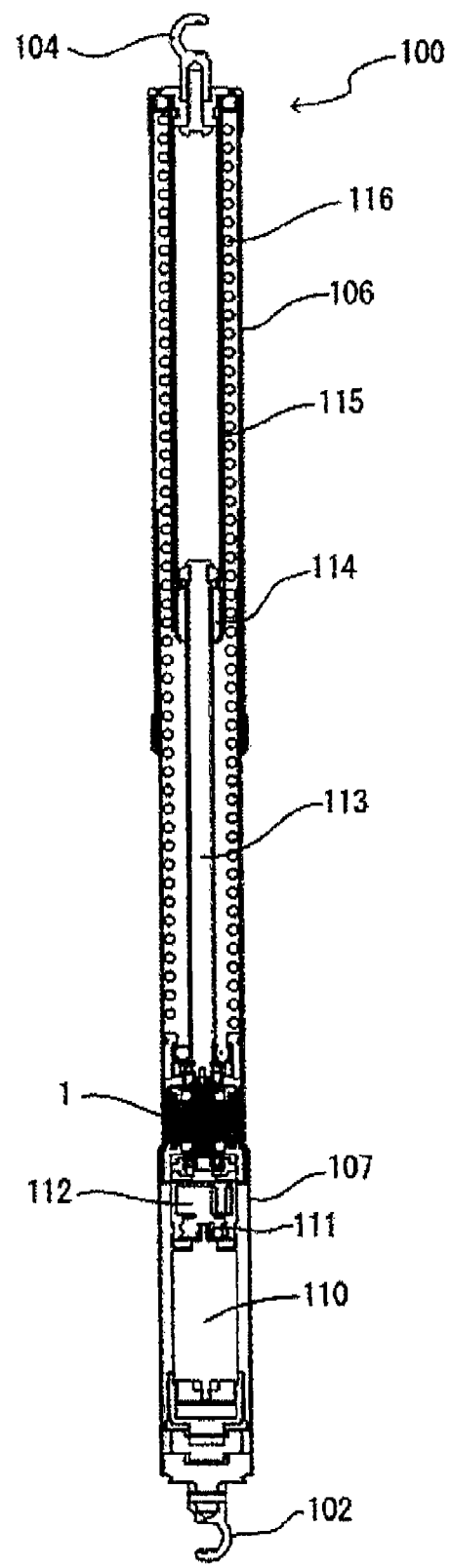

RESISTANCE GENERATING DEVICE FOR DRIVE UNIT

CROSS REFERENCE TO RELATED APPLICATIONS

This application is based on and claims priority under 35 U.S.C. §119 to Japanese Patent Application 2014-017518, filed on Jan. 31, 2014, the entire content of which is incorporated herein by reference.

TECHNICAL FIELD

This disclosure generally relates to a resistance generating device for a drive unit which opens and closes an opening and closing member of a vehicle.

BACKGROUND DISCUSSION

A known vehicle is provided with a drive unit that opens and closes an opening and closing member, for example, a back door (i.e., serving as an opening and closing member), a swing door, a slide door, and a window. For example, a first end portion of the drive unit that opens and closes the back door (tailgate) includes a coupling connected to a vehicle body, and a second end portion of the drive unit includes a coupling connected to the opening and closing member. The drive unit includes a threaded spindle, a spindle nut and a spindle tube. The threaded spindle rotates by motive power of a motor and human power (power) of an operator. The spindle nut is threaded with the threaded spindle. The spindle tube includes a first end portion which is fixed to the spindle nut and a second end portion which is fixed to the coupling connected to the opening and closing member.

In a case where the threaded spindle rotates by motive power, rotary motion of the threaded spindle is converted into linear motion of the spindle nut by the threaded spindle and the spindle nut. Accordingly, the spindle tube fixed to the spindle nut moves linearly to open and close the opening and closing member. In addition, the drive unit is constructed to open and close the opening and closing member manually by an operator.

The drive unit includes a compressive coil spring for holding the opening and closing member in an opened state. The compressive coil spring holds the opening and closing member in the opened state by generating reaction force which balances with the weight of the opening and closing member per se. As disclosed in JP4885910B (hereinafter referred to as Patent reference 1), a drive unit is provided with a resistance generating device which generates resistance against rotary motion of a threaded spindle in order to hold an opening and closing member in an opened state even in a case where an external force, for example wind or snow, is applied to the opening and closing member.

As disclosed in Patent reference 1, the resistance generating device for a drive unit includes the threaded spindle and a spindle nut. The resistance generating device disclosed in Patent reference 1 is provided with a fixing member, a ring magnet and a rotary member. The fixing member is made from non-magnetizable material, for example, plastic or aluminum. The ring magnet is disposed inside the fixing member. The rotary member is placed outside the fixing member. In a case where a motor is in a stopped state, magnetic force of the ring magnet attracts the rotary member toward the fixing member to have the rotary member contact the fixing member. Accordingly, resistance against the rotary motion of the rotary member is generated. On the other hand, in a case where the motor is in motion, the centrifugal force is applied to the rotary member and releases resistance against the rotary motion of the rotary member because the rotary member separates from the fixing member.

Another resistance generating device for a window, a door, a lid and a shelf of a building material, furniture, vehicle and machinery is disclosed in JP2005-265174A (hereinafter referred to as Patent reference 2). The resistance generating device disclosed in Patent reference 2 includes a fixing member and a rotary member. Each of the fixing member and the rotary member is provided with the north pole magnets and the south pole magnets which are alternately disposed with each other. The fixing member and the rotary member are disposed close to, and facing with each other. The rotary member rotates relative to the fixing member in a non-contact manner. The magnetic force generates resistance against rotary motion of the rotary member.

However, according to Patent reference 1, because resistance is generated by frictional force having an unstable characteristic, resistance force may be largely changed due to abrasion deterioration or wetting of a surface of the fixing member or the rotary member and due to extraneous materials (abrasion powder) attached to the surface of the fixing member or the rotary member. Further, friction noise may be generated in a case where the rotary member slides relative to the fixing member. Similarly, contact noise (for example, tapping sound) may be generated in a case where the rotary member comes in contact with the fixing member. In addition, a large number of members may be necessary to move the rotary member by an application of the centrifugal force, which complicates the construction of the resistance generating device.

According to Patent reference 2, because the rotary member rotates relative to the fixing member in a non-contact manner to generate resistance, the abrasion of the surface of the fixing member or the rotary member does not occur. However, the resistance generating device disclosed in Patent reference 2 costs high because both the rotary member and the fixing member are provided with magnets.

A need thus exists for a resistance generating device for a drive unit which is not susceptible to the drawback mentioned above.

SUMMARY

According to an aspect of this disclosure, a resistance generating device for a drive unit opening and closing an opening and closing member of a vehicle includes a rotary body being rotated for opening and closing the opening and closing member, a transmission member being rotated in response to an applied power, the transmission member transmitting a rotary motion to the rotary body, and a fixing member provided to form a clearance between the fixing member and the transmission member in a radial direction of a rotary axis of the transmission member, the fixing member surrounding a periphery of the transmission member. One of the fixing member and the transmission member includes a magnet and the other of the fixing member and the transmission member includes a magnetic body. The magnet is disposed to face the magnetic body so that a facing position of the magnet and the magnetic body facing each other is changed as the transmission member rotates. The magnet is disposed to face the magnetic body so that magnetic poles at the facing position of the magnet and the magnetic body alternate as the transmission member rotates. The magnetic body and the magnet generate a magnetic force therebetween, the magnetic force generating a resistance against an opening and closing movement of the opening and closing member.

BRIEF DESCRIPTION OF THE DRAWINGS

The foregoing and additional features and characteristics of this disclosure will become more apparent from the following detailed description considered with the reference to the accompanying drawings, wherein:

FIG. 2A is a cross sectional view of the drive unit in a case where the back door is fully closed according to the embodiments;

FIG. 2B is a cross sectional view of the drive unit in a case where the back door is fully opened according to the embodiments;

DETAILED DESCRIPTION

Embodiments of this disclosure will be explained with reference to the drawings. For example, sizes, materials, forms and relative positions of components shown in the embodiments are not limited to the embodiments unless any specific descriptions are given.

A drive unit is used for opening and closing an opening and closing member, for example, a swing door, a slide door, and a window of a vehicle. According to the embodiments, a magnet-type door holding device for a spindle-type powered-back door will be explained as one example of the drive unit. Alternatively, the drive unit can be used for raising and lowering a vehicle seat.

Figure 1:
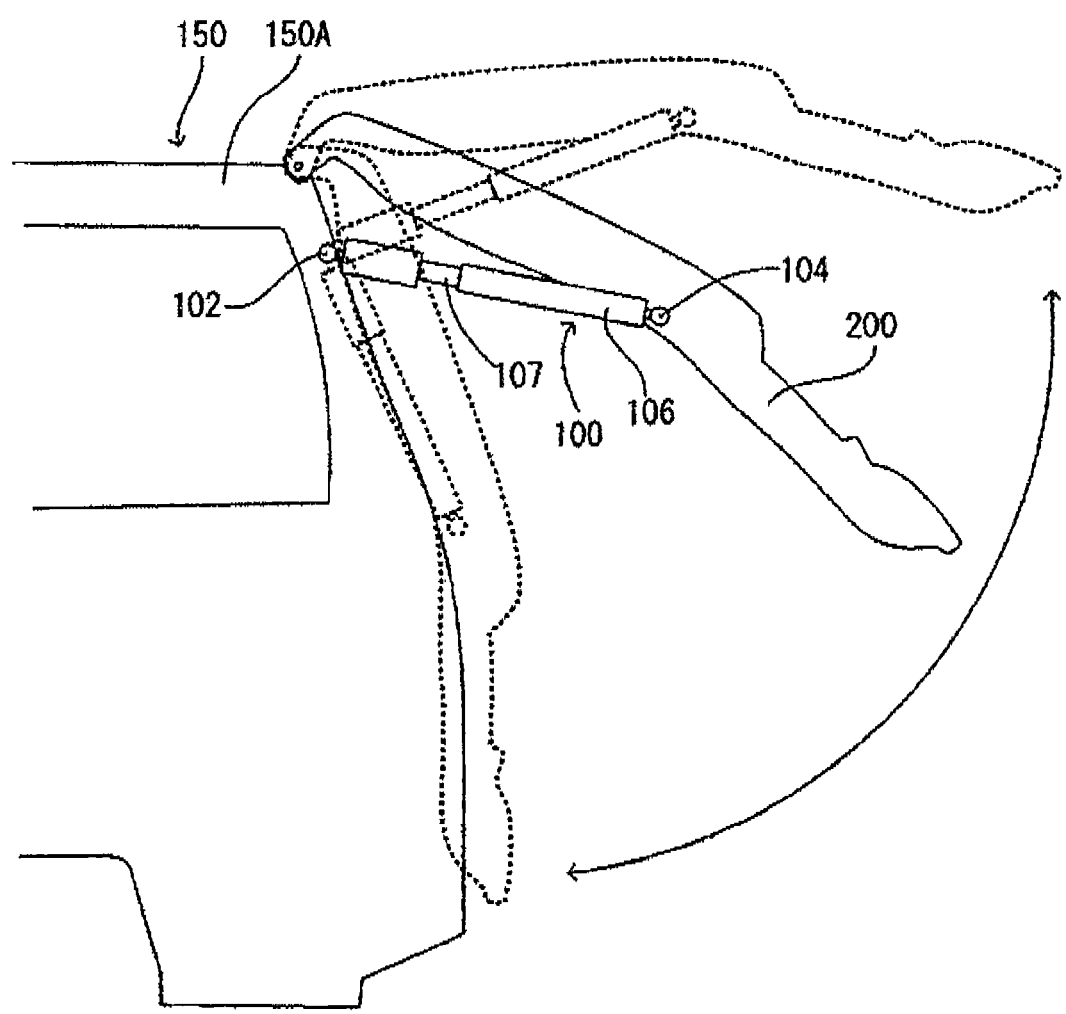
FIG. 1 is a view showing a drive unit mounted to a back door of a vehicle according to embodiments disclosed here.

As shown in FIG. 1, a drive unit 100 corresponds to a drive unit for the spindle-type powered-back door. The drive units 100 are disposed at opposing sides of a vehicle body 150A of a vehicle 150 in a width direction and are interposed between the vehicle body 150A and a back door 200. A first coupling 102 and a second coupling 104 are provided at opposing end portions of the drive unit 100. The first coupling 102 of the drive unit 100 is connected to the vehicle body 150A. The second coupling 104 of the drive unit 100 is connected to the back door 200 (i.e., serving as an opening and closing member), A cylindrical cover tube 106 moves relative to a cylindrical-shaped housing tube 107 by a motor 110 built in the drive unit 100 to open and close the back door 200.

As shown in FIGS. 2A and 2B, the drive unit 100 includes the housing tube 107 and the cover tube 106 which is fitted to the housing tube 107 telescopically. The cover tube 106 can reciprocate in an axial direction relative to the housing tube 107. The cover tube 106 and the housing tube 107 construct a telescopic tube which is extendable and contractible. An end portion of the housing tube 107 is provided with the first coupling 102 and an end portion of the cover tube 106 is provided with the second coupling 104.

The motor 110 serving as a drive source of the drive unit 100 is contained in the housing tube 107. A rotary shaft 111 of the motor 110 is connected to a reduction gear 112 which corresponds to a planetary gear. The reduction gear 112 is connected to the resistance generating device 1 and transmits motive power of the motor 110 to the resistance generating device 1. The resistance generating device 1 is connected to a threaded spindle 113 (i.e., serving as a rotary body) and transmits the rotary motion of the motor 110 to the threaded spindle 113.

The spindle nut 114 is threaded onto the threaded spindle 113. The threaded spindle 113 is rotatably held or retained by the housing tube 107. The threaded spindle 113 is positioned within a cylindrical-shaped spindle tube 115. One end portion of the spindle tube 115 is fixed to the spindle nut 114 while the other end portion of the spindle tube 115 is fixed to the second coupling 104 and the cover tube 106.

A compressive coil spring 116 is contained inside the cover tube 106. The compressive coil spring 116 generates biasing force that balances with the weight of the back door 200 per se or that exceeds holding force for holding the weight of the back door 200.

In a case where the motor 110 rotates, the threaded spindle 113 rotates via the reduction gear 112 and the resistance generating device 1. The threaded spindle 113 is threaded onto the spindle nut 114 so that the rotary motion of the threaded spindle 113 is converted into linear motion of the spindle nut 114 and the spindle tube 115. The linear motion of the spindle nut 114 and the spindle tube 115 moves the cover tube 106 relative to the housing tube 107 to open and close the back door 200.

In a case where the back door 200 is fully closed, as shown in FIG. 2A, the spindle nut 114 is disposed at a lower portion of the threaded spindle 113. Most portions of the cover tube 106 cover the housing tube 107. That is, the telescopic tube is in a contracted state. In a case where the motor 110 rotates to open the back door 200, the spindle nut 114 moves upward in response to the rotation of the threaded spindle 113. In a case where the back door 200 is fully opened, as shown in FIG. 2B, the spindle nut 114 is disposed at an upper portion of the threaded spindle 113. The cover tube 106 moves upward relative to the housing tube 107. That is, the telescopic tube is in an extended state.

The cover tube 106 can be stopped at any desirable positions relative to the housing tube 107. The weight of the back door 200 per se is applied to the cover tube 106 which is stopped at the desirable position, however, the weight of the back door 200 per se balances with biasing force applied by the compressive coil spring 116. Thus, the back door 200 can be stopped at any desirable positions. In a case where an undesirable external force, for example wind, is applied to the back door 200, the resistance generating device 1 generates resistance against the opening and closing motions of the back door 200 and maintains the position of the back door 200.

The resistance generating device 1 of a first embodiment will be explained as follows. The drive unit 100 includes the compressive coil spring 116 to inhibit the back door 200 from being closed by the own weight of the back door 200 in a case where the back door 200 is in an opened state. However, according to a known back door of a vehicle, in a case where a load, for example wind or snow, is applied to the back door in a state where the back door is in the opened state, the back door may be closed undesirably. In those circumstances, the drive unit 100 is provided with the resistance generating device 1 so as not to close the back door 200 even in a case where some degree of the external force is applied to the opened back door 200.

Figure 3:
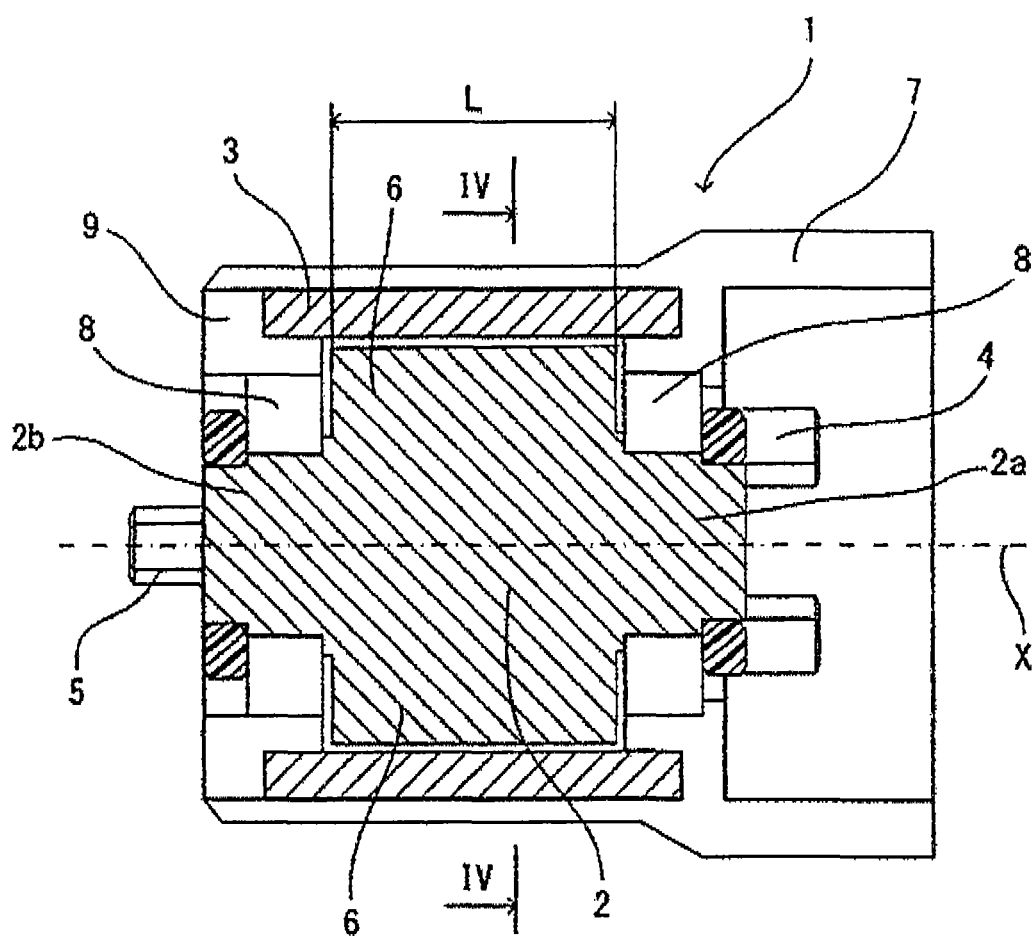
FIG. 3 is a longitudinal cross sectional view of a resistance generating device of a first embodiment.
Figure 4:
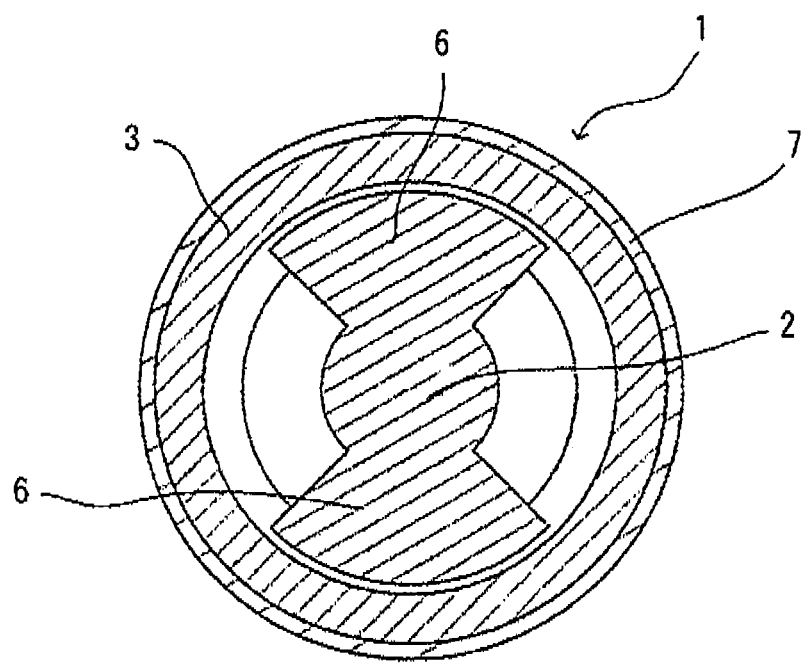
FIG. 4 is a lateral cross sectional view of the resistance generating device taken along line IV-IV in FIG. 3.

As shown in FIGS. 3 and 4, the resistance generating device 1 is provided with a rotatable iron core 2 (i.e., serving as a transmission member, a magnetic body) and a ring magnet 3 (i.e., serving as a fixing member, a magnet) which surrounds an outer circumference of the iron core 2 in a non-contact manner.

The iron core 2 includes a first connection portion 4 (power receiving portion) disposed at a first end portion 2a and a second connection portion 5 disposed at a second end portion 2b. The first connection portion 4 is connected to the reduction gear 112. The second connection portion 5 is connected to the threaded spindle 113. The first connection portion 4 rotates in response to motive power of the motor 110 via the reduction gear 112. The iron core 2 transmits rotary motion received at the first connection portion 4 to the threaded spindle 113. According to the embodiment, the first connection portion 4, the second connection portion 5 and the iron core 2 are integrally formed. Alternatively, each of the first connection portion 4 and the second connection portion 5 may be formed individually, or separately from the iron core 2. The iron core 2 includes a magnetic body, that is, a material that is attracted to a magnet (ferromagnetic body). The iron core 2 per se is favorably a magnetic body that does not have magnetic poles, for example, the south magnetic pole or S pole, or the north magnetic pole or N pole.

The ring magnet 3 includes plural magnetic poles, and the S poles and the N poles are alternately arranged on the ring magnet 3 in a circumferential direction. According to the embodiments, the ring magnet 3 includes, for example, four magnetic poles which are configured by two S-poles and two N-poles (see FIG. 5), however is not limited. Alternatively, the number of the magnetic poles may be, for example, two, six, and eight. According to the embodiments, the ring magnet 3 is a permanent magnet. Alternatively, the ring magnet 3 can be an electromagnet as needed.

According to the embodiments, the ring magnet 3 is used, however a magnet does not need to be formed in a ring shape. Alternatively, plural separated magnets are applicable. The ring magnet 3 is held by a holder 7. The holder 7 is fixed within the housing tube 107 of the drive unit 100. Alternatively, the ring magnet 3 may be held directly within the housing tube 107 without the holder 7.

As shown in FIG. 3, the first and second end portions 2a, 2b are rotatably supported by bearings 8, respectively, so that the iron core 2 rotates about a rotary axis X. The bearings 8 are held by the holder 7 and a holder cap 9. In a case where the rotary axis X of the iron core 2 is not precisely coaxial with an axis of the ring magnet 3, the iron core 2 may come in contact with the ring magnet 3 in response to the rotation of the iron core 2. In those circumstances, each of the bearings 8 is attached to the first and second end portions 2a and 2b of the icon core 2 in order to secure the accuracy of the positioning of the rotary axis X of the iron core 2 relative to the axis of the ring magnet 3. Accordingly, the iron core 2 securely rotates relative to the ring magnet 3 in the non-contact manner.

The bearing 8 favorably corresponds to a sliding bush or a rolling bearing. In a case where the bearings 8 are held by the holder 7, the iron core 2 can rotate stably. Alternatively, the bearings 8 may be directly held by the ring magnet 3 instead of the holder 7. The iron core 2 disposed inside the ring magnet 3 is provided with plural protrusions 6 (i.e., serving as a magnetic body, a magnetic body portion) which are formed in fan-shaped wings. The whole body of the iron core 2 including the plural protrusions 6 is made from the magnetic body. A surface of the iron core 2 can be coated with a coating material to inhibit corrosion. Alternatively, a non-magnetic body can cover gaps between the plural protrusions 6 so that the iron core 2 can be formed in a substantially cylindrical shape.

According to the first embodiment, the iron core 2 is provided with the two protrusions 6. Alternatively, the number of the protrusion 6 can be, for example, four, six and eight. The plural protrusions 6 are favorably placed to be equally spaced from each other at the outer circumference of the iron core 2. The protrusions 6 extend outwardly in a radial direction from a body portion of the iron core 2 and extend along the rotary axis X. The longer a length L of the protrusion 6 in an axial direction of the rotary axis X shown in FIG. 3, the greater the magnetic force can be generated. Resistance against rotary motion of the iron core 2 can be appropriately generated by setting the length L of the protrusion 6 appropriately.

Figure 5:
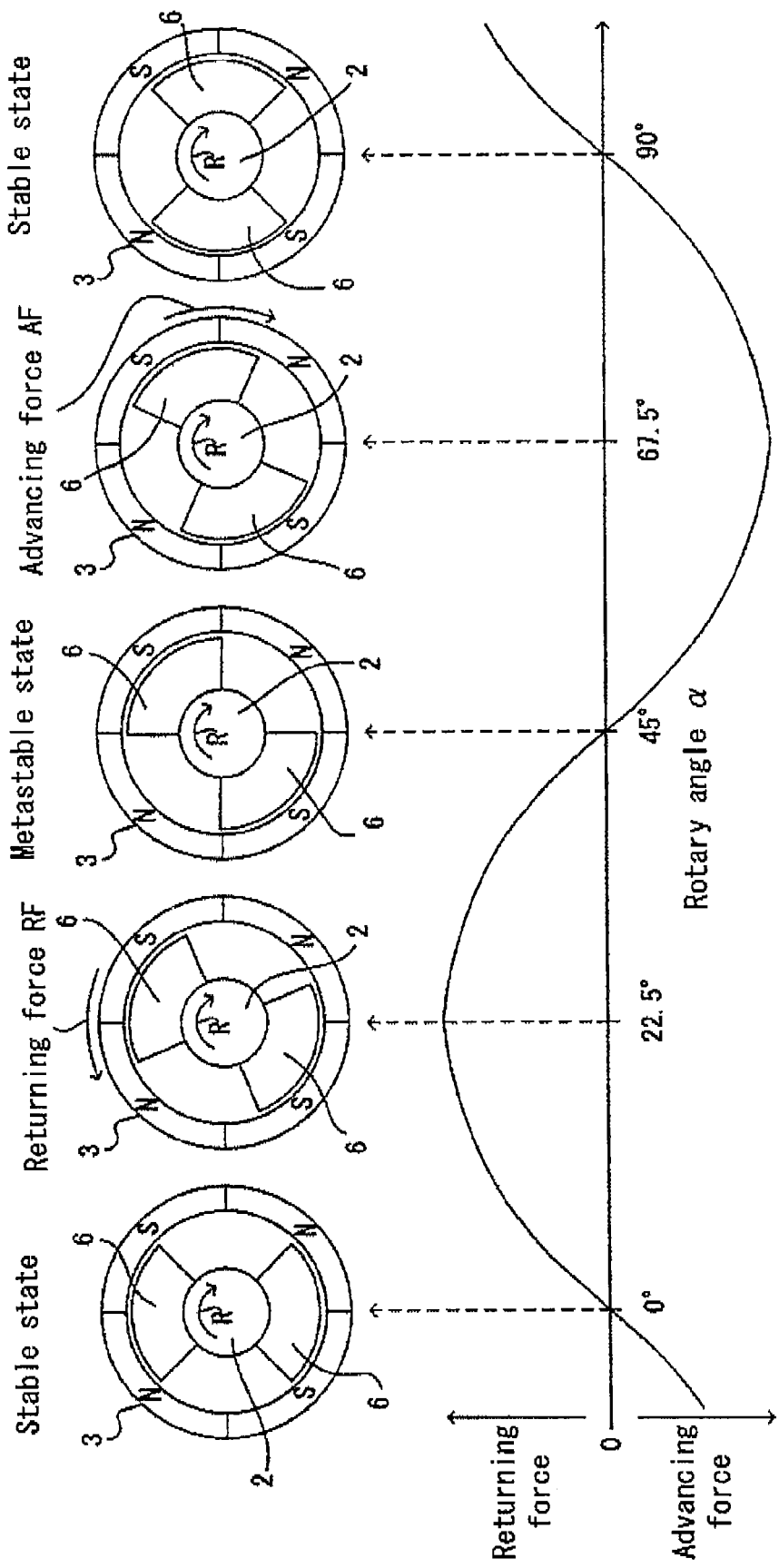
FIG. 5 is a view showing a relationship between a rotary angle of an iron core and power applying to the iron core.

In a case where the iron core 2 including the plural protrusions 6 rotates inside the ring magnet 3, resistance (torque) for holding a rotary position (phase) of the iron core 2 is generated by the magnetic force. Hereinafter, resistance applied to the resistance generating device 1 will be explained with reference to FIG. 5. As shown in FIG. 5, the iron core 2 rotates in a direction of an arrow indicating a rotary direction R. In a case where a rotary angle α of the iron core 2 is at zero degree, a center portion of the protrusion 6 of the iron core 2 is positioned at a boundary between the S pole and the N pole of the ring magnet 3. In those circumstances, the iron core 2 is in a stable state and has a characteristic to be held at this position, that is, the center portion of the protrusion 6. In a case where the iron core 2 rotates in the rotary direction R because the back door 200 is opened and closed by motive power of the motor 110 or by manual operation, the protrusions 6 moves toward the S pole and a returning force RF that has a characteristic to return the iron core 2 to an opposite direction to the rotary direction R by the magnet force is applied to the iron core 2. In a case where the rotary angle α of the iron core 2 is at 22.5 degrees, the returning force RF comes to be maximum. The rotary angle α in which the returning force RF is maximized is changed in accordance with the length of the protrusion 6 in the circumferential direction. For example, in a case where the length of the protrusion 6 in the circumferential direction is shortened, the returning force RF comes to be the maximum at the rotary angle α which is smaller than 22.5 degrees. In a case where the length of the protrusion 6 in the circumferential direction is extended, the returning force RF comes to be the maximum at the rotary angle α which is greater than 22.5 degrees.

In a case where the iron core 2 rotates further in the rotary direction R, the returning force RF decreases. In a case where the rotary angle α of the iron core 2 is at 45 degrees, the iron core 2 comes to be in a metastable state where the magnetic force is not applied to the iron core 2. The rotary angle α in which the iron core 2 comes to be in the metastable state is changed in accordance with a length of the ring magnet 3 having the S pole in the circumferential direction. For example, in a case where the length of the ring magnet 3 having the S pole in the circumferential direction is shortened, the iron core 2 comes to be in the metastable state at the rotary angle α which is smaller than 45 degrees. In a case where the length of the ring magnet 3 having the S pole in the circumferential direction is extended, the iron core 2 comes to be in the metastable state at the rotary angle α which is greater than 45 degrees. In a case where the iron core 2 rotates further in the rotary direction R, an advanced force AF advancing the iron core 2 in the rotary direction R is applied to the iron core 2 by the magnetic force. In a case where the rotary angle α of the iron core 2 is at 67.5 degrees, the advancing force AF comes to be maximum. The rotary angle α in which the advancing force AF is maximized is changed in accordance with the length of the protrusion 6 in the circumferential direction and the length of the ring magnet 3 having the S pole in the circumferential direction. For example, in a case where the length of the protrusion 6 in the circumferential direction is shortened, the advancing force AF comes to be the maximum at the rotary angle α which is larger than 67.5 degrees. In a case where the length of the protrusion 6 in the circumferential direction is extended, the advancing force AF comes to be the maximum at the rotary angle α which is smaller than 67.5 degrees. On the other hand, in a case where the length of the ring magnet 3 having the S pole in the circumferential direction is shortened, the advancing force AF comes to be the maximum at the rotary angle α which is smaller than 67.5 degrees. In a case where the length of the ring magnet 3 having the S pole in the circumferential direction is extended, the advancing force AF comes to be the maximum at the rotary angle α which is greater than 67.5 degrees. In a case where the iron core 2 rotates further in the rotary direction R, the advancing force AF decreases. In a case where the rotary angle α of the iron core 2 is at 90 degrees, the iron core 2 comes to be in a stable state and has the characteristic to be held at this position, that is, the center portion of the protrusion 6. As described above, the rotary angle α in which the iron core 2 comes to be in the stable state is changed in accordance with the length of the protrusion 6 in the circumferential direction and the length of the ring magnet 3 having the S pole in the circumferential direction.

In a case where the iron core 2 further rotates, the relationship between each of the aforementioned rotary angles α from 0 to 90 degrees and powers applying to the iron core 2 will be repeated. Thus, strong resistance (holding power) by the magnetic force is applied to the iron core 2 in a case where the iron core 2 rotates by each of 0, 90, 180 and 270 degrees (or every 0, 90, 180, and 270 degrees of the rotary angle). Accordingly, resistance which is generated intermittently is applied to the iron core 2 in a case where the iron core 2 rotates. Thus, the iron core 2 moves intermittently (to perform a machine-like movement). The resistance against the opening and closing motions of the back door 200 is generated by the magnetic force occurring between the iron core 2 and the ring magnet 3. The resistance includes the holding force for holding the back door 200 in the opened state.

The back door 200 may be held at any desirable positions by the placement of the resistance generating device 1 between the reduction gear 112 and the threaded spindle 113 of the drive unit 100. More precisely, the back door 200 can be held at a door angle which can be changed gradually with the machine-like movement in a case where the back door 200 is opened and closed. The more the rotary speed of the motor 110 is reduced by the reduction gear 112, the more efficiently the resistance generating device 1 can generate resistance.

According to the first embodiment, the resistance generating device 1 generating resistance against the rotary motion of the threaded spindle 113 is employed by a simple construction in which the iron core 2 and the ring magnet 3 are placed between the reduction gear 112 and the threaded spindle 113. Because the iron core 2 and the ring magnet 3 generate magnetic torque in the non-contact manner, the abrasion of the iron core 2 and the ring magnet 3 can be inhibited. Accordingly, the resistance generating device 1 performs stably without an influence of the change of the surface of the iron core 2 or the ring magnet 3. Thus, the frictional noise between the iron core 2 and the ring magnet 3 is not generated. Further, the resistance generating device 1 can be formed without an elastic member, for example, a spring. Thus, the life of the resistance generating device 1 may be extended.

Because resistance (holding power) generated between the iron core 2 and the ring magnet 3 increases and decreases repeatedly, resistance is leveled in a case where the motor 110 or the threaded spindle 113 rotates at a relatively high speed. Accordingly, in a case where the motor 110 or the threaded spindle 113 rotates at equal to or larger than a predetermined rotary speed, resistance (holding power) is released or decreases so that a releasing device for releasing resistance (holding power) generated between the iron core 2 and the ring magnet 3 does not need to be provided in addition to the resistance generating device 1.

According to the embodiments, the resistance generating device 1 may generate large resistance against the opening and closing motions of the back door 200 with a simple configuration. Further, the resistance generating device 1 includes holding power for holding the back door 200 in the opened state. Because holding power is generated at regular intervals, for example, at 90 degrees, an operator can experience a favorable operation feeling, that is, a tactile feeling in a case where an operator manually opens the back door 200. In a case where the back door 200 is opened and closed at a high speed, torque increasing and decreasing by the magnetic force is leveled so that the resistance against the opening and closing operations of the back door 200 may be released or may decrease.

Because the ring magnet 3 which has strong magnetic force is now relatively inexpensive in accordance with the development of, for example, a motor, the manufacturing cost of the resistance generating device 1 can decrease. Because the iron core 2 rotates relative to the ring magnet 3 in the non-contact manner inside the ring magnet 3, the abrasion of the iron core 2 and the ring magnet 3 does not occur, leading to the extension of the life of the resistance generating device 1. Because the iron core 2 and the ring magnet 3 are coaxially and rotatably disposed with each other, torque for holding the phase of the iron core 2 strongly may be generated. Because the magnetic force can be largely generated by the extension of the length L of the iron core 2 and then length L of the ring magnet 3 in the axial direction of the rotary axis X, the resistance generating device 1 may generate larger resistance (holding power).

A second embodiment of this disclosure will be explained. For convenience of description, the same components as those described in the first embodiment are marked with the same reference numerals, and description of the components will not be repeated. A drive unit of the second embodiment includes the same construction of the drive unit of the first embodiment and will not be explained. The construction of a resistance generating device 11 of the second embodiment is different from the construction of the resistance generating device 1 of the first embodiment and will be explained.

The difference of the resistance generating device 11 of the second embodiment from the resistance generating device 1 of the first embodiment will be explained. The same construction of the resistance generating device 11 as the construction of the resistance generating device 1 will not be explained. According to the resistance generating device 1 of the first embodiment, the iron core 2 serving as the transmission member transmitting the motive power of the motor 110 to the threaded spindle 113 is made from the magnetic body. A transmission member 12 of the resistance generating device 11 of the second embodiment includes a body 13 (i.e., serving as a holding portion) which corresponds to a non-magnetic body and plural magnetic bodies 14 which are provided at an outer circumference of the body 13.

Figure 6:
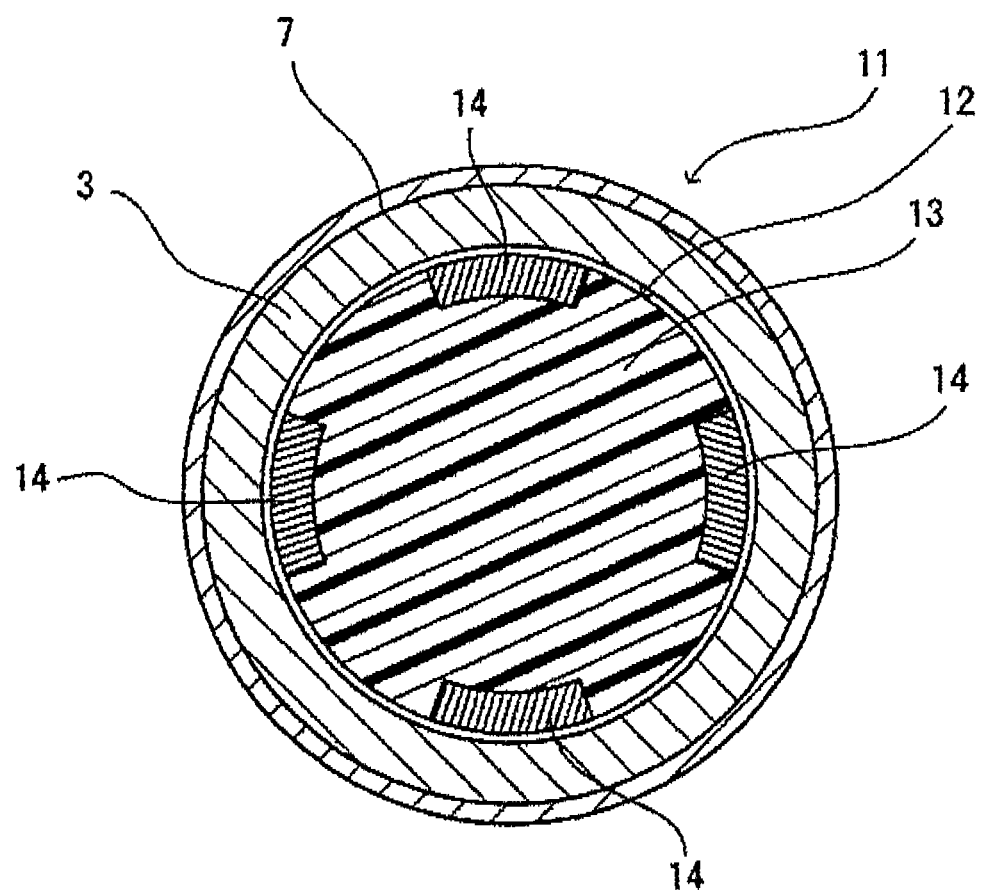
FIG. 6 is a lateral cross sectional view of a resistance generating device according to a second embodiment disclosed here.

As shown in FIG. 6, the resistance generating device 11 includes the rotatable transmission member 12 and the ring magnet 3 (the fixing member) which surrounds the outer circumference of the transmission member 12 in the non-contact manner. The ring magnet 3 is held by the holder 7. The transmission member 12 includes the body 13 which is rotatable and the plural magnetic bodies 14 placed at an outer circumference of the body 13. According to the embodiment, the four magnetic bodies 14 are provided, however is not limited. The number of the magnetic bodies 14 is not limited and can be, for example, two, six, and eight. The magnetic body 14 includes a material which is attracted to a magnet (ferromagnetic body), for example, an iron. The magnetic body 14 per se favorably corresponds to a magnetic body that does not have a magnetic pole of the S pole or the N pole.

Figure 7:
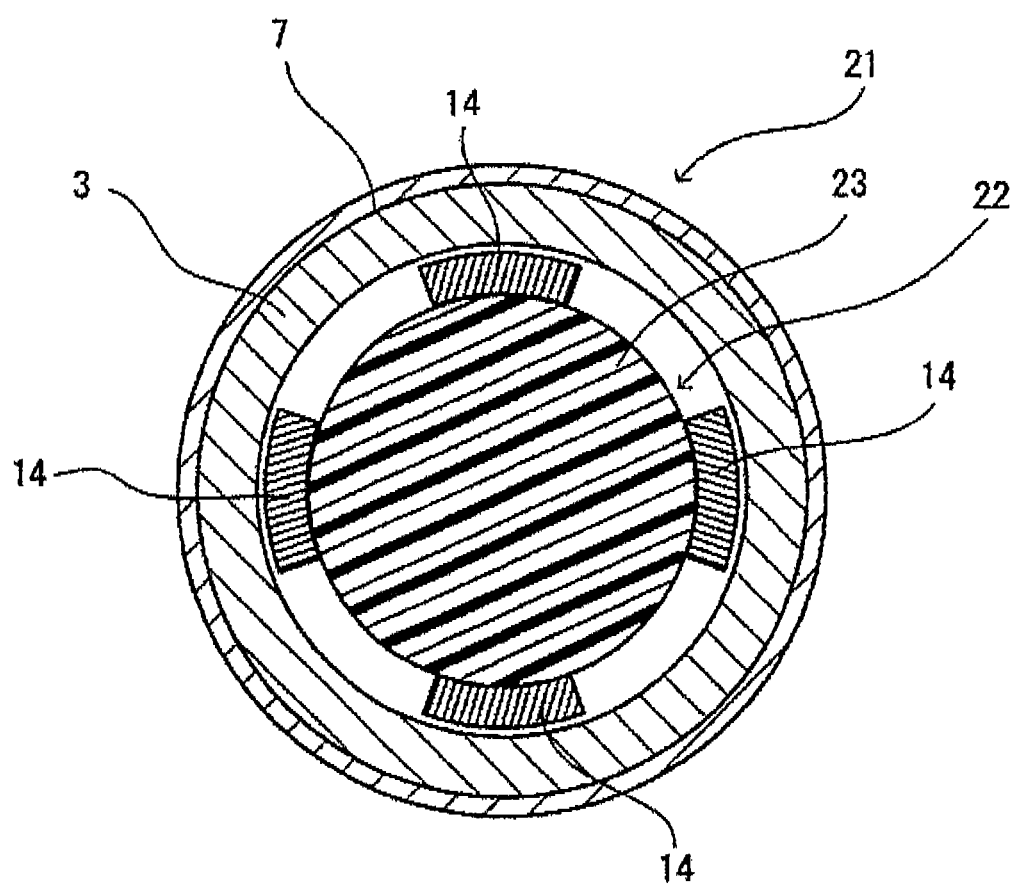
FIG. 7 is a lateral cross sectional view of a resistance generating device according to a modified example of the second embodiment disclosed here.

The body 13 is made from the non-magnetic body. The non-magnetic body corresponds to, for example, resin, aluminum and steel use stainless or SUS. According to the second embodiment, the body 13 is formed in a substantially cylindrical-shape, however, is not limited as long as the body 13 holds the plural magnetic bodies 14. As shown in FIG. 7, a modified example of a resistance generating device 21 of the second embodiment is provided with a transmission member 22 which includes a body 23 (serving as a holding portion) which is rotatable and the plural magnetic bodies 14 which are provided at an outer circumference of the body 23. The plural magnetic bodies 14 serve as plural protrusions and are fixed to the body 23. Similarly to the iron core 2 of the first embodiment, the transmission member 12, 22 includes the first connection portion 4 at the first end portion 2a and the second connection portion 5 at the second end portion 2b. The first connection portion 4 is connected to the reduction gear 112. The second connection portion 5 is connected to the threaded spindle 113. The first connection portion 4 rotates in response to the motive power of the motor 110 via the reduction gear 112. The transmission member 12, 22 transmits the rotary motion inputted to the first connection portion 4 to the threaded spindle 113. According to the modified example of the second embodiment, the first and second connection portions 4, 5 and the body 13, 23 of the transmission member 12, 22 are integrally formed. Alternatively, the first and second connection portions 4, 5 can be individually formed from the body 13, 23 of the transmission member 12, 22.

Figure 8:
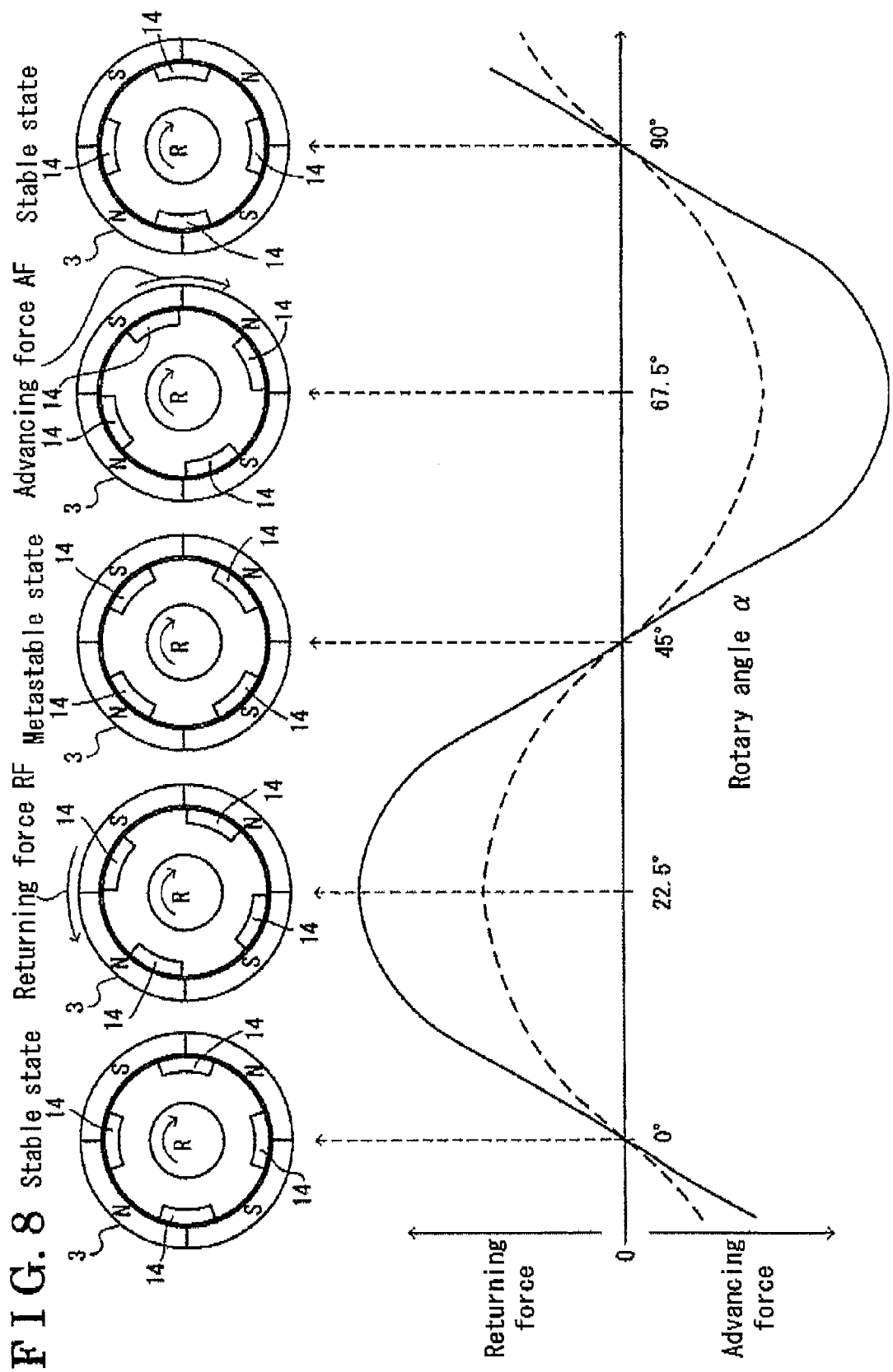
FIG. 8 is a view showing a relationship between a rotary angle of a transmission member and power applying to the transmission member according to the second embodiment.

In a case where the transmission member 12, 22 rotates inside the ring magnet 3, resistance (torque) for holding the rotary position (phase) of the transmission member 12, 22 is generated by the magnetic force. As shown in FIG. 8, each of generating principles of the returning force RF and of the advancing force AF corresponds to be the same as each of the generation principles of the returning force RF and of the advancing force AF of the first embodiment and will not be explained. In FIG. 8, resistance (holding power) of the first embodiment is shown in a dotted line. The resistance generating device 11 of the second embodiment can generate greater resistance (holding power) than the resistance generating device 1 of the first embodiment.

A third embodiment of this disclosure will be explained. For convenience of description, the same components as those described in the first embodiment are marked with the same reference numerals, and description of the components will not be repeated. A drive unit of the third embodiment includes the same construction of the drive unit of the first embodiment and will not be explained. The construction of a resistance generating device 31 of the third embodiment is different from the construction of the resistance generating device 1 of the embodiment and will be explained.

The difference of the resistance generating device 31 of the third embodiment from the resistance generating device 1 of the first embodiment will be explained. The same construction of the resistance generating device 31 as the resistance generating device 1 will not be explained. According to the resistance generating devices 1, 11 of the first and second embodiments, each of the transmission members 2, 12 includes a magnetic body and each of the fixing members 3 includes a magnet. Alternatively, a transmission member 32 of the resistance generating device 31 of the third embodiment includes a magnet and a fixing member 33 (i.e., serving as a magnetic body) includes the magnetic body.

Figure 9:
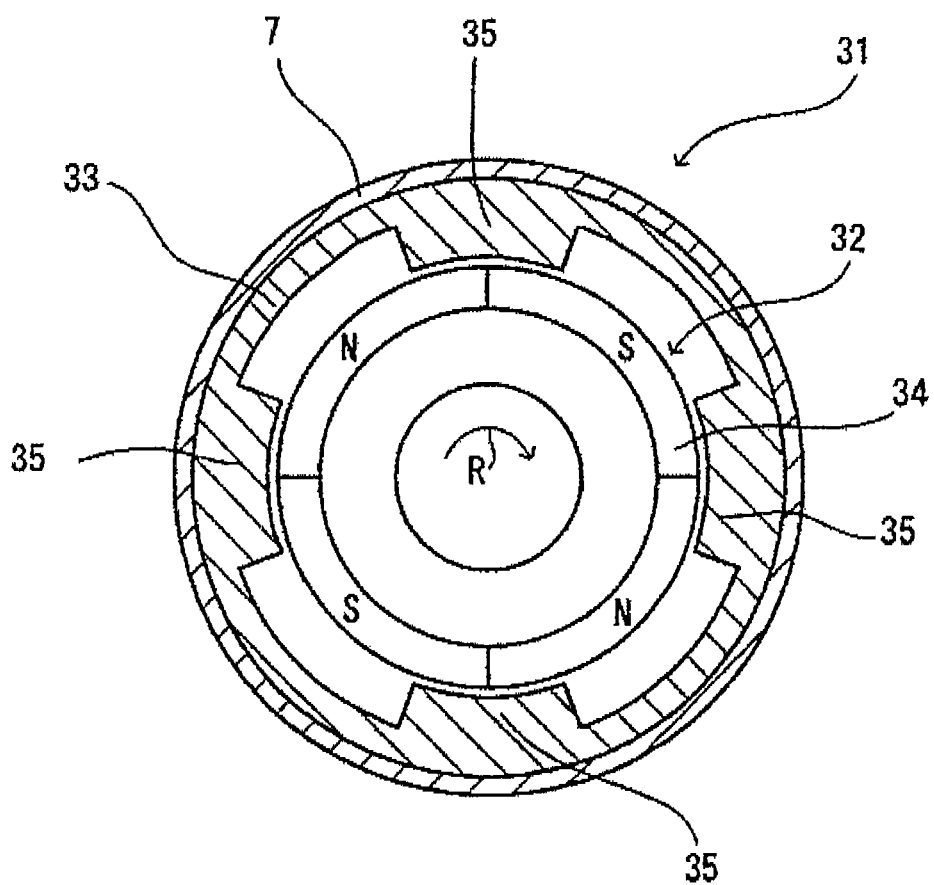
FIG. 9 is a lateral cross sectional view of a resistance generating device according to a third embodiment disclosed here.

As shown in FIG. 9, the resistance generating device 31 includes the transmission member 32 which is rotatable and the fixing member 33 which surrounds the outer circumference of the transmission member 32 in the non-contact manner relative to the transmission member 32. The transmission member 32 includes a ring magnet 34 (i.e., serving as a magnet). An outer circumference of the ring magnet 34 includes plural poles. The fixing member 33 corresponds to a ring magnetic body. The fixing member 33 includes plural protrusions 35 protruding toward the transmission member 32 which is positioned inside the fixing member 33 in the radial direction.

Figure 10:
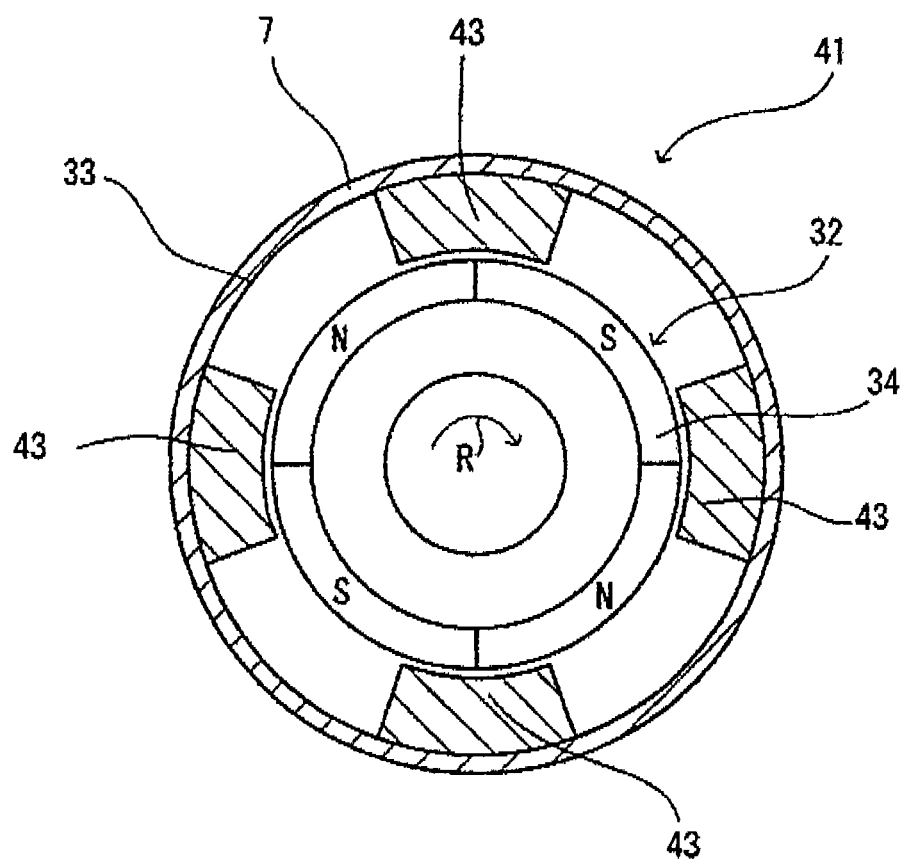
FIG. 10 is a lateral cross sectional of a resistance generating device according to a modified example of the third embodiment disclosed here.

In a case where the transmission member 32 rotates inside the fixing member 33, resistance (torque) for holding the rotary position (phase) of the transmission member 32 is generated by the magnet force. The third embodiment obtains the similar effects and advantages as the effects and advantages of the first and second embodiments. In FIG. 9, the fixing member 33 of the resistance generating device 31 corresponds to the ring magnetic body. In FIG. 10, a resistance generating device 41 of a modified example of the third embodiment includes the fixing member 33 which is provided with plural magnetic bodies 43. The plural separated magnetic bodies 43 are held by the holder 7.

In a case where the transmission member 32 rotates inside the plural magnetic bodies 43, resistance (torque) for holding the rotary position (phase) of the transmission member 32 is generated by the magnetic force. The resistance generating device 41 of the modified example of the third embodiment obtains the similar effects and advantages as the effects and advantages of the first and second embodiments.

A fourth embodiment of this disclosure will be explained. For convenience of description, the same components as those described in the first embodiment are marked with the same reference numerals, and description of the components will not be repeated. A drive unit of the fourth embodiment includes the same construction of the drive unit of the first embodiment and will not be explained. The construction of a resistance generating device 41 of the fourth embodiment is different from the construction of the resistance generating device 1 of the first embodiment and will be explained.

Figure 11:
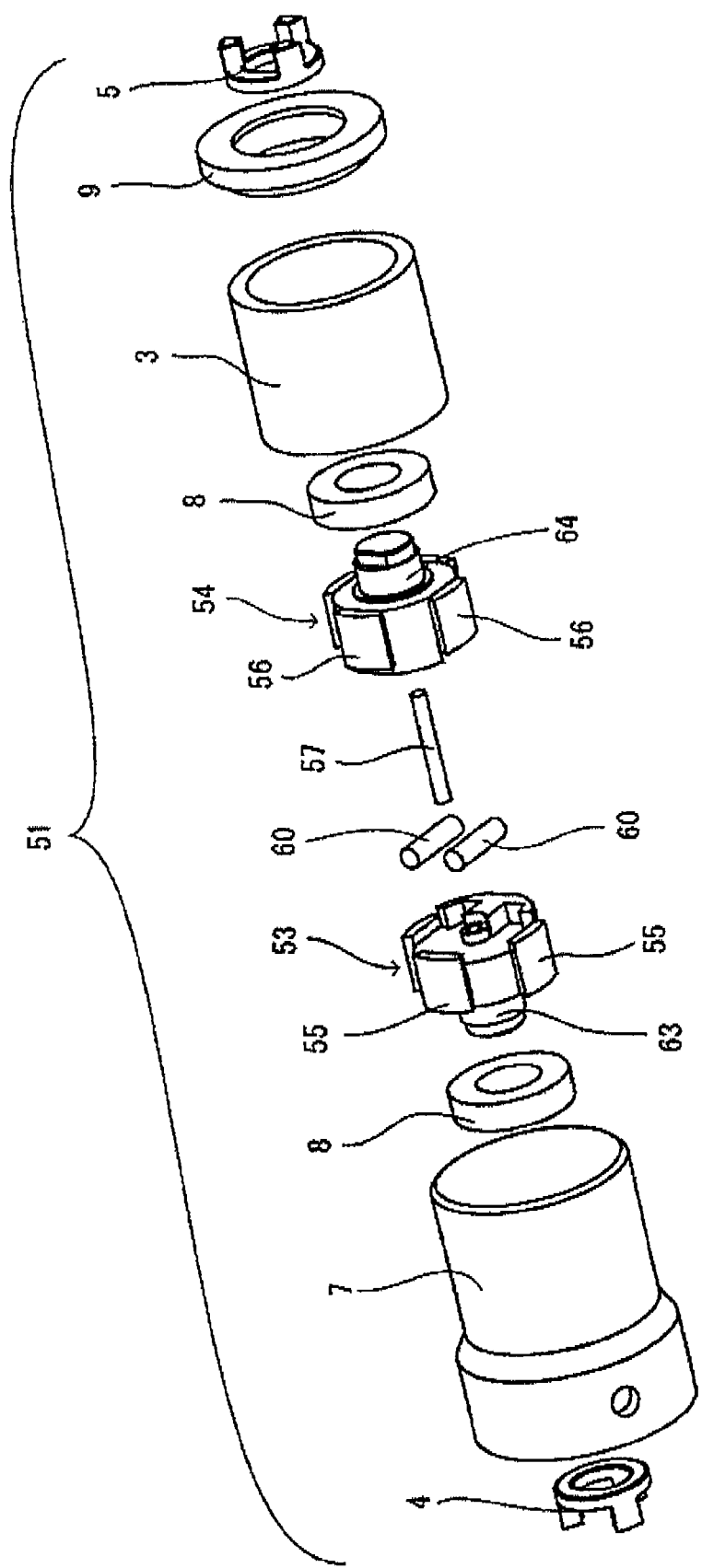
FIG. 11 is an exploded perspective view of a resistance generating device of a fourth embodiment disclosed here.
Figure 12:
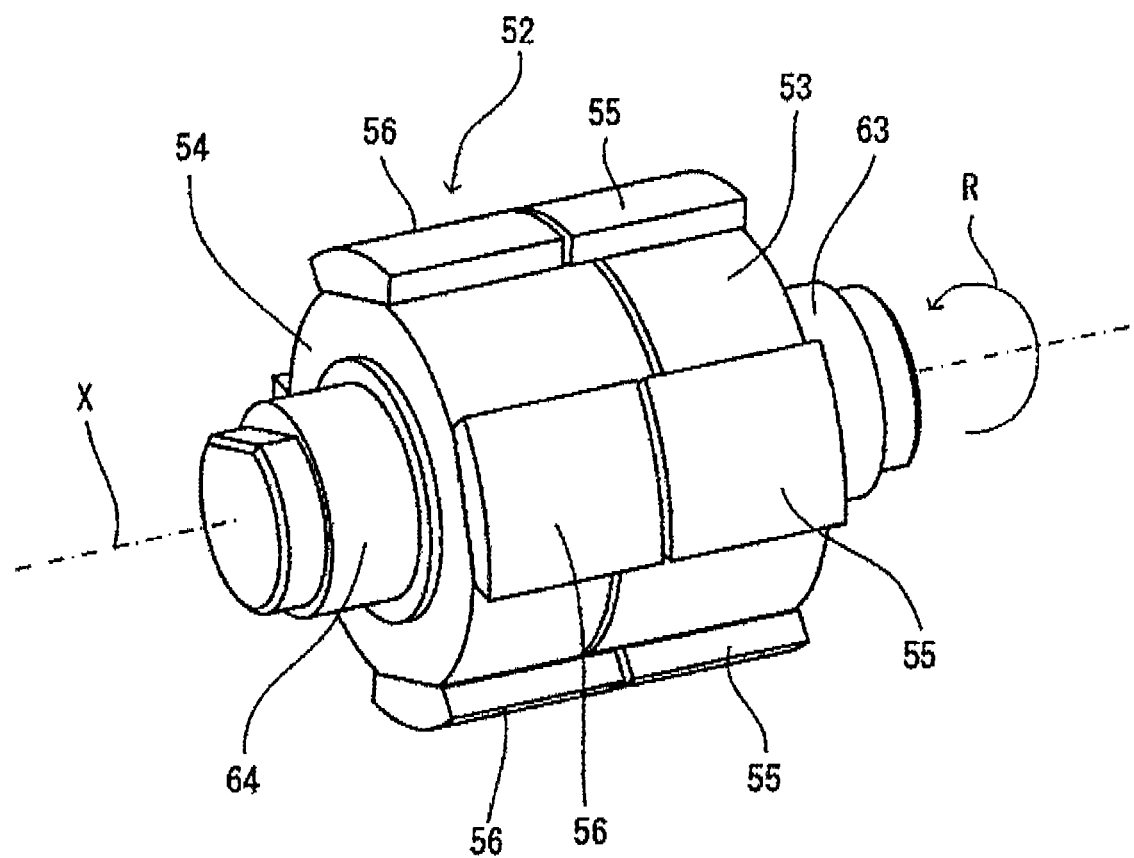
FIG. 12 is a perspective view of a transmission member of the fourth embodiment.

According to the fourth embodiment shown in FIGS. 11 and 12, a transmission member 52 of a resistance generating device 51 is formed with plural members in the axial direction of the rotary axis X. Each of the plural transmission members 52 is constructed to be displaced from each other in the rotary direction R by the rotation of the plural transmission members 52. Each of the plural transmission members 52 is displaced from each other in the rotary direction R so that resistance generated by the magnetic force may be reduced. Thus, resistance generated by the resistance generating device 51 can be reduced in a case where the motor 11 is activated.

As shown in FIG. 12, according to the resistance generating device 51 of the fourth embodiment, the transmission member 52 transmitting the motive power of the motor 110 to the threaded spindle 113 are formed with two members. Alternatively, for example, the transmission member 52 may be formed with three or four members which are more than three. The transmission member 52 is provided with a first transmission member 53 and a second transmission member 54. Plural magnetic bodies 55 are fixed to an outer circumference of the first transmission member 53. The plural magnetic bodies 55 are favorably placed to be equally spaced from each other at the outer circumference of the first transmission member 53. Plural magnetic bodies 56 are fixed to an outer circumference of the second transmission member 54. The plural magnetic bodies 56 are favorably placed to be equally spaced from each other at the outer circumference of the second transmission member 54, Each number of the magnetic bodies 55, 56 is not limited to four. Alternatively, each number of the magnetic bodies 55, 56 can be, for example, two, six and eight.

Figure 13:
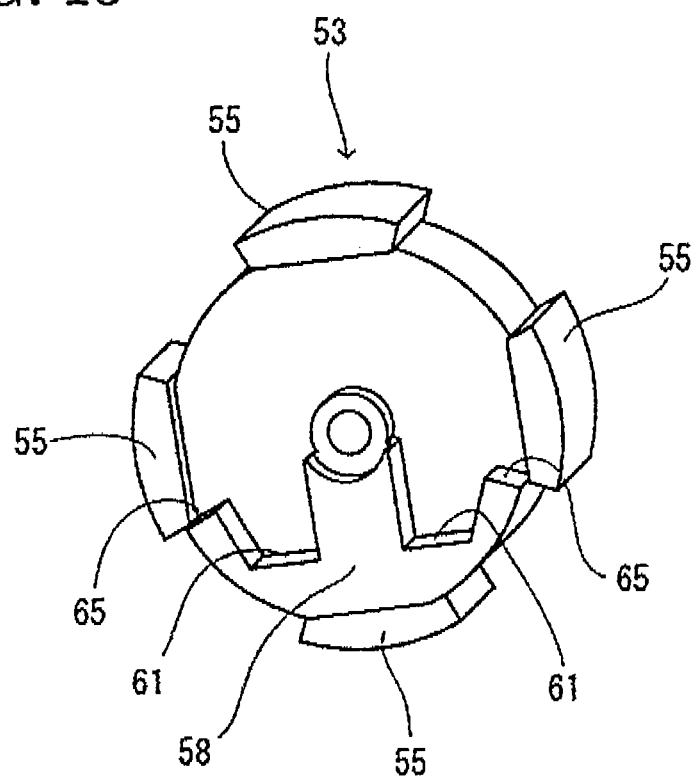
FIG. 13 is a view showing a facing surface of a first transmission member which faces a second transmission member according to the fourth embodiment.
Figure 14:
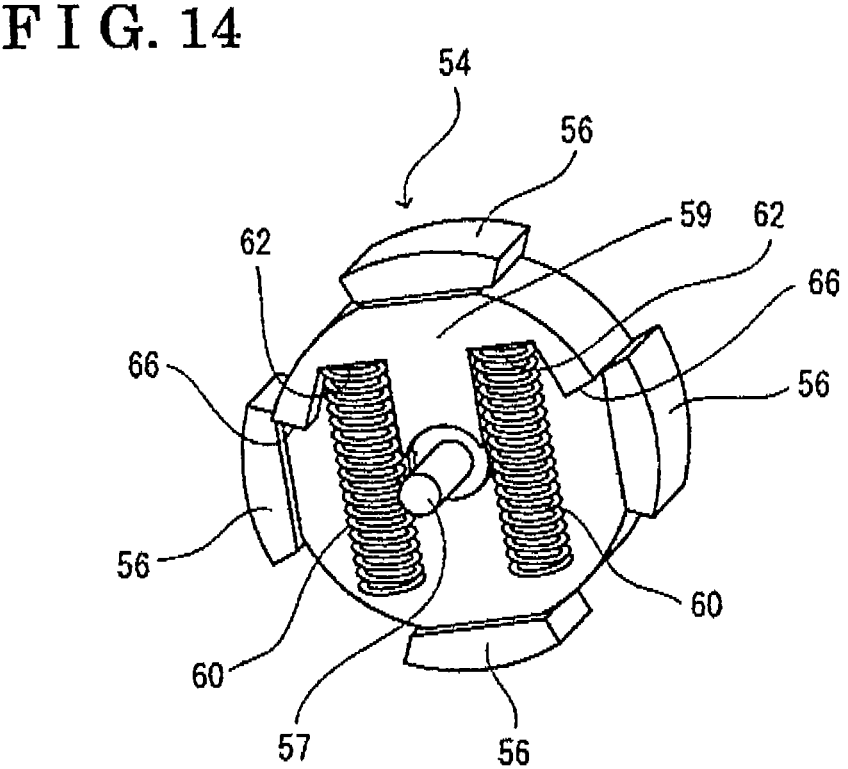
FIG. 14 is a view showing a facing surface of the second transmission member which faces the first transmission member according to the fourth embodiment.

The transmission member 52 is favorably made from a magnetic body. As shown in FIG. 11, the first and second transmission members 53, 54 are rotatably supported with each other by a cylindrical shaft 57. As shown in FIGS. 13, 14, the first and second transmission members 53, 54 are supported by the cylindrical shaft 57 so that a facing surface 58 of the first transmission member 53 face a facing surface 59 of the second transmission member 54.

For example, two compression springs 60 (i.e., serving as a biasing member), elastic members, are placed between the first and second transmission members 53, 54. The facing surface 58 of the first transmission member 53 is provided with spring holding portions 61 holding the compression springs 60, respectively. The facing surface 59 of the second transmission member 54 is provided with spring holding portions 62 holding the compression springs 60, respectively. The compression springs 60 are held between the spring holding portions 61, 62 of the first and second transmission members 53, 54. The compression springs 60 facilitate the relative rotation of the first and second transmission members 53, 54 while generating resistance against the relative rotation of the first and second transmission members 53, 54.

As shown in FIG. 13, stopper portions 65 serving as stoppers are provided at the facing surface 58 of the first transmission 53. As shown in FIG. 14, stopper portions 66 serving as stoppers are provided at the facing surface 59 of the second transmission 54. In a case where the first and second transmission members 53, 54 relatively rotate with each other, the stopper portions 65, 66 come in contact with each other to set relative rotation amounts of the first and second transmission members 53, 54 within predetermined ranges.

The cylindrical shaft 57, the compression springs 60, and the stopper portions 65, 66 construct a means (portion) for changing a relative position of (or a position changing means (portion) for the relative position of) the first and second transmission members 53, 54 in the rotary direction R. As shown in FIG. 11, the first transmission member 53 includes a first shaft 63. The second transmission member 54 includes a second shaft 64. The first shaft 63 of the first transmission member 53 is rotatably supported by one of the bearings 8 supported by the holder 7. The second shaft 64 of the second transmission member 54 is rotatably supported by the other of the bearings 8 supported by the holder cap 9. Accordingly, the first and second transmission members 53, 54 rotate about the rotary axis X shown in FIG. 12.

As shown in FIG. 11, the transmission member 52 (the first and second transmission members 53, 54) is contained inside the ring magnet 3 (the fixing member). The ring magnet 3 surrounds an outer circumference of the transmission member 52 in the non-contact manner. The first connection portion 4 is connected to the first shaft 63 of the first transmission member 53. The second connection portion 5 is connected to the second shaft 64 of the second transmission member 54. The first connection portion 4 is connected to the reduction gear 112. The second connection portion 5 is connected to the threaded spindle 113. The first connection portion 4 rotates in response to motive power of the motor 110 via the reduction gear 112. The transmission member 52 transmits the rotary motion inputted to the first connection portion 4 to the threaded spindle 113.

Figure 15:
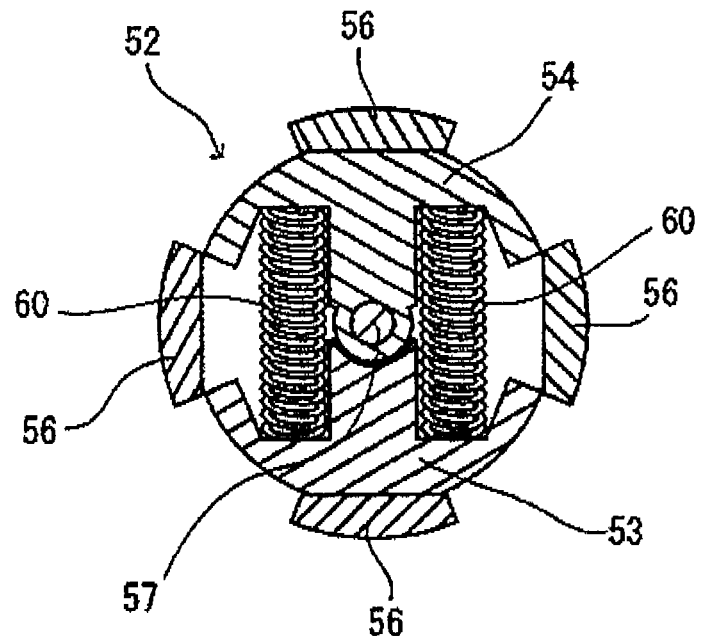
FIG. 15A is an explanatory view of the transmission member showing an initial state where the first transmission member and the second transmission member are not in a relatively rotated state with each other according to the fourth embodiment.
FIG. 15B is an explanatory view of the transmission member showing a displaced state where the first transmission member and the second transmission member are in a relatively rotated state with each other according to the fourth embodiment.
Figure 15:
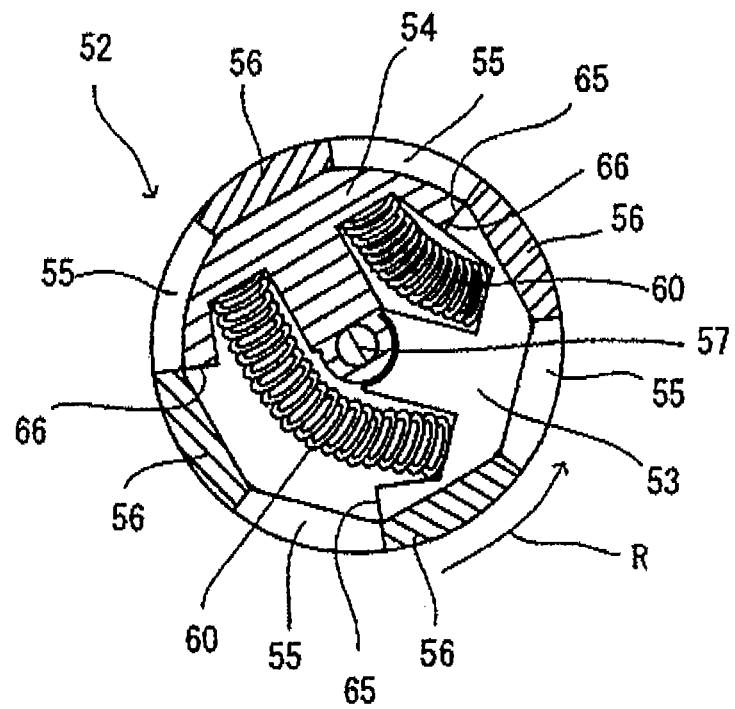

As shown in FIG. 15A, in a case where the motor 110 is in a stopped state, the first and second transmission members 53, 54 are in an initial state where the magnetic bodies 55 of the first transmission member 53 and the magnetic bodies 56 of the second transmission member 54 are placed at the same position in the rotary direction R, or placed to be overlapped with each other in the rotary direction R by biasing force of the two compression springs 60. In a case where the first and second transmission members 53, 54 are in the initial state, the magnetic bodies 55 of the first transmission member 53 are aligned in lines with the magnetic bodies 56 of the second transmission member 54 along the rotary axis X as shown in FIG. 12. Thus, the resistance against the rotary motion of the threaded spindle 113 is generated by the magnetic force occurring between the set of the magnetic bodies 55, 56 of the first and second transmission members 53, 54 and the ring magnet 3, Accordingly, in a case where an outer load, for example wind and snow, is applied to the opened back door 200 to rotate the threaded spindle 113, the magnetic bodies 55, 56 and the ring magnet 3 generate the holding force for inhibiting the rotation of the threaded spindle 113.

In a case where the motor 110 rotates, as shown in FIG. 15B, the first and second transmission members 53, 54 relatively rotate with each other by the compression of one of the compression springs 60 and the extension of the other of the compression springs 60. The first and second transmission members 53, 54 are in a displaced state where the magnetic bodies 55 of the first transmission member 53 and the magnetic bodies 56 of the second transmission member 54 are displaced from each other in the rotary direction R. In those circumstances, the stopper portion 65 of the first transmission member 53 comes in contact with the stopper portions 66 of the second transmission member 54 to inhibit the relative rotation of the first and second transmission members 53, 54 by a predetermined rotary amount or higher. This holding is performed in order to inhibit the damage of the compression springs 60 as well as establishing a state where the magnetic bodies 55 (56) are placed to be equally spaced from each other in the whole circumference to minimize the resistance holding force.

Figure 16:
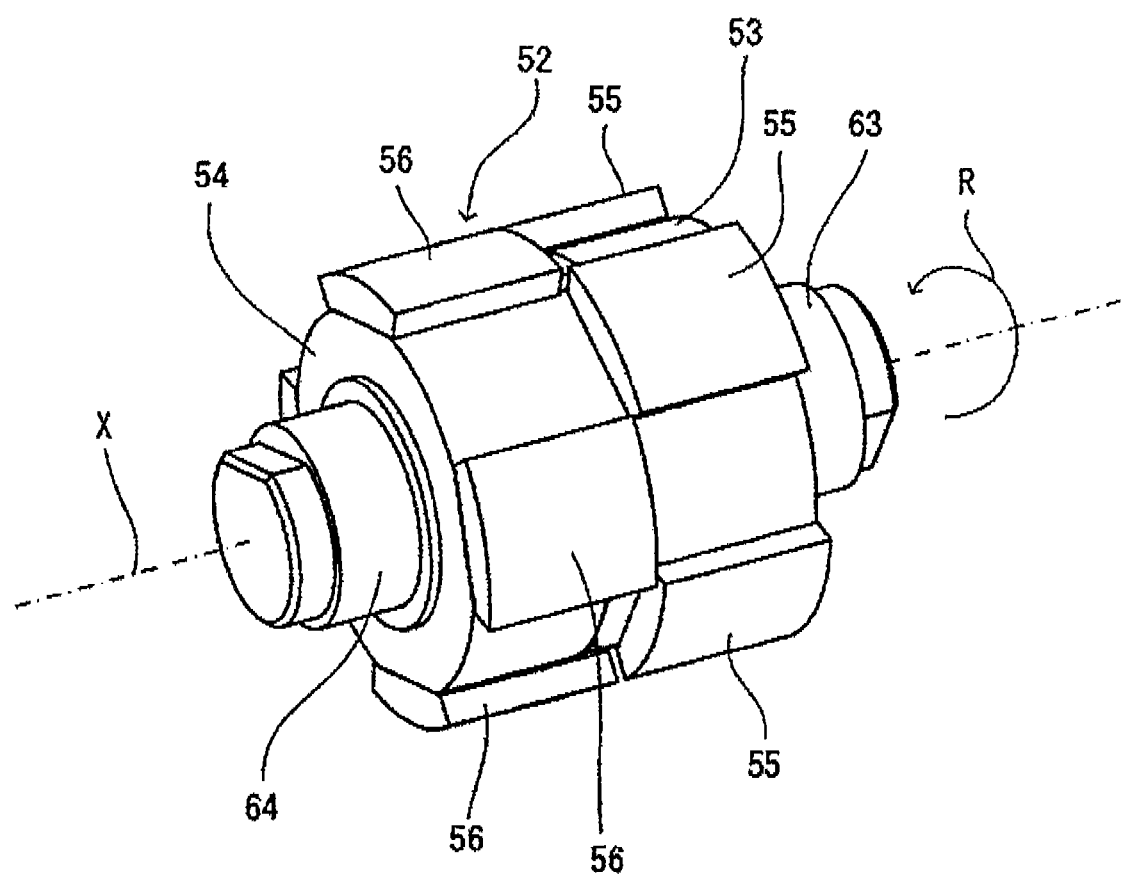
FIG. 16 is a perspective view of the transmission member showing the displaced state of the first transmission member and the second transmission member in a case where the first transmission member and the second transmission member relatively rotate with each other according to the fourth embodiment.

As shown in FIG. 16, in a case where the first and second transmission members 53, 54 are in the displaced state, the position (phase) of the magnetic bodies 55 of the first transmission member 53 and the position (phase) of the magnetic bodies 56 of the second transmission member 54 are displaced from each other when seen along the rotary axis X. That is, the position (phase) of the magnetic bodies 55 of the first transmission member 53 and the position (phase) of the magnetic bodies 56 of the second transmission member 54 are displaced from each other in the circumferential direction. Thus, the magnetic force generated between the magnetic body 55 of the first transmission member 53 and the ring magnet 3 and the magnet force generated between the magnetic body 56 of the second transmission member 54 and the ring magnet 3 offset or balance with each other and resistance against the rotary motion of the transmission member 52 (the holding force of the transmission member 52) is released (decreased). Accordingly, torque is inhibited from increasing in a case where the motor 110 is activated.

According to the fourth embodiment, the transmission member 52 includes the magnet bodies 55, 56. The ring magnet 3 is placed at the outer circumference of the transmission member 52. Alternatively, the transmission member 52 can include a magnet and a fixing member placed at the outer circumference of the transmission member 52 can include a magnetic body. According to the embodiments, the rotary body corresponds to the threaded spindle 113, Alternatively, the rotary body can be a connection device or a gear.

According to the embodiments, the first connection portion 4 (power receiving portion) receives the motive power of the motor 110, however is not limited. The first connection portion 4 (power receiving portion) can be constructed to receive the human power (power) of an operator. According to the aforementioned embodiments, the resistance generating device 1, 11, 21, 31, 41, 51 is mounted to the drive unit for opening and closing the back door 200. Alternatively, a resistance generating mechanism of this disclosure may be mounted to a motive power transmission portion of a motor drive unit, for example, drive units for a power slide door and for a swing door, and may be mounted to a motive power transmission portion of a hand operating system, for example, a manual seat lifting device and a wind regulator. The resistance generating device 1, 11, 21, 31, 41, 51 can generate resistance for inhibiting an opened door, a closed window or a lifted seat from closing, opening or falling due to the action of gravity.

According to the aforementioned embodiment, the resistance generating device 1, 11, 21, 31, 41, 51 for the drive unit 100 opening and closing the opening and closing member 200 of the vehicle 150 includes the rotary body (the threaded spindle 113) being rotated for opening and closing the opening and closing member (the back door 200), the transmission member (the iron core 2, the transmission member 12, the transmission member 22, the transmission member 32, the transmission member 52, the fits transmission member 53, the second transmission member 54) being rotated in response to the applied power, the transmission member (the iron core 2, the transmission member 12, the transmission member 22, the transmission member 32, the transmission member 52, the fits transmission member 53, the second transmission member 54) transmitting the rotary motion to the rotary body (the threaded spindle 113), and the fixing member (3, 33) provided to form the clearance between the fixing member (the ring magnet 3, the fixing member 33) and the transmission member (the iron core 2, the transmission member 12, the transmission member 22, the transmission member 32, the transmission member 52, the fits transmission member 53, the second transmission member 54) in the radial direction of the rotary axis X of the transmission member (the iron core 2, the transmission member 12, the transmission member 22, the transmission member 32, the transmission member 52, the fits transmission member 53, the second transmission member 54), the fixing member (the ring magnet 3, the fixing member 33) surrounding the periphery of the transmission member (the iron core 2, the transmission member 12, the transmission member 22, the transmission member 32, the transmission member 52, the fits transmission member 53, the second transmission member 54). One of the fixing member (the ring magnet 3, the fixing member 33) and the transmission member (the iron core 2, the transmission member 12, the transmission member 22, the transmission member 32, the transmission member 52, the fits transmission member 53, the second transmission member 54) includes the magnet (3, 34) and the other of the fixing member (the ring magnet 3, the fixing member 33) and the transmission member (the iron core 2, the transmission member 12, the transmission member 22, the transmission member 32, the transmission member 52, the fits transmission member 53, the second transmission member 54) includes the magnetic body (the iron core 2, the protrusion 6, the magnetic body 14, the fixing member 33, the magnetic body 43, the magnetic body 55, the magnetic body 56). The magnet (the ring magnet 3, 34) is disposed to face the magnetic body (2, 6, 14, 33, 43, 55, 56) so that the facing position of the magnet (the ring magnet 3, 34) and the magnetic body (the iron core 2, the protrusion 6, the magnetic body 14, the fixing member 33, the magnetic body 43, the magnetic body 55, the magnetic body 56) facing each other is changed as the transmission member (the iron core 2, the transmission member 12, the transmission member 22, the transmission member 32, the transmission member 52, the fits transmission member 53, the second transmission member 54) rotates. The magnet (3, 34) is disposed to face the magnetic body (the iron core 2, the protrusion 6, the magnetic body 14, the fixing member 33, the magnetic body 43, the magnetic body 55, the magnetic body 56) so that the magnetic poles at the facing position of the magnet (the ring magnet 3, 34) and the magnetic body (the iron core 2, the protrusion 6, the magnetic body 14, the fixing member 33, the magnetic body 43, the magnetic body 55, the magnetic body 56) alternate as the transmission member the iron core 2, the transmission member 12, the transmission member 22, the transmission member 32, the transmission member 52, the fits transmission member 53, the second transmission member 54) rotates. The magnetic body (the iron core 2, the protrusion 6, the magnetic body 14, the fixing member 33, the magnetic body 43, the magnetic body 55, the magnetic body 56) and the magnet (the ring magnet 3, 34) generate the magnetic force therebetween, the magnetic force generating the resistance against the opening and closing movement of the opening and closing member (the back door 200).

According to the aforementioned embodiment, the resistance against the opening and closing motion of the back door 200 can be generated and released between the transmission member (the iron core 2, the transmission member 12, the transmission member 22, the transmission member 32, the transmission member 52, the fits transmission member 53, the second transmission member 54) and the fixing member (the ring magnet 3, the fixing member 33) in the non-contact state while reducing the number of the magnet.

According to the aforementioned embodiment, the transmission member (the iron core 2, the transmission member 12, the transmission member 22, the transmission member 32, the transmission member 52, the fits transmission member 53, the second transmission member 54) includes the plural magnetic body portions (the protrusion 6, the magnetic body 14, the magnetic body 43, the magnetic body 55, the magnetic body 56) disposed at the outer peripheral portion of the transmission member (the iron core 2, the transmission member 12, the transmission member 22, the transmission member 32, the transmission member 52, the fits transmission member 53, the second transmission member 54), the plural magnetic body portions (the protrusion 6, the magnetic body 14, the magnetic body 43, the magnetic body 55, the magnetic body 56) extending in the circumferential direction of the transmission member (the iron core 2, the transmission member 12, the transmission member 22, the transmission member 32, the transmission member 52, the fits transmission member 53, the second transmission member 54).

According to the aforementioned embodiment, the resistance against the opening and closing motion of the back door 200 can be generated and released between the transmission member (the iron core 2, the transmission member 12, the transmission member 22, the transmission member 32, the transmission member 52, the fits transmission member 53, the second transmission member 54) and the fixing member (the ring magnet 3, the fixing member 33) in the non-contact state while reducing the number of the magnet.

According to the aforementioned embodiment, the transmission member (12, 22) includes the holding portion (the body 13, the body 23) which is the non-magnetic body, the holding portion (the body 13, the body 23) holding the plural magnetic body portions (the magnetic body 14).

According to the aforementioned embodiment, the plural magnetic bodies 14 can be held by the body 13, 23.

According to the aforementioned embodiment, the fixing member (the ring magnet 3) is formed in the ring shape. The fixing member (the ring magnet 3) is the ring magnet (3) of which magnetic poles alternate in the circumferential direction of the ring magnet (3).

According to the aforementioned embodiment, the resistance against the opening and closing motion of the back door 200 can be generated and released between the transmission member (the iron core 2, the transmission member 12, the transmission member 22, the transmission member 32, the transmission member 52, the fits transmission member 53, the second transmission member 54) and the fixing member (the ring magnet 3, the fixing member 33) in the non-contact state while reducing the number of the magnet.

According to the aforementioned embodiment, the opening and closing member (the back door 200) is the back door (200) of the vehicle (150) and the rotary body (the threaded spindle 113) is the threaded spindle 113 for opening and closing the back door (200).

According to the aforementioned embodiment, the resistance against the opening and closing motion of the back door 200 can be generated and released between the transmission member (the iron core 2, the transmission member 12, the transmission member 22, the transmission member 32, the transmission member 52, the fits transmission member 53, the second transmission member 54) and the fixing member (the ring magnet 3, the fixing member 33) in the non-contact state while reducing the number of the magnet.

According to the aforementioned embodiment, the transmission member (the iron core 2, the transmission member 12, the transmission member 22, the transmission member 32, the transmission member 52, the fits transmission member 53, the second transmission member 54) is connected to the reduction gear (112) and receives the drive force of the motor (110) via the reduction gear (112).

According to the aforementioned embodiment, the more the rotary speed of the motor 110 is reduced by the reduction gear 112, the more efficiently the resistance generating device 1 can generate resistance.

According to the aforementioned embodiment, the transmission member (the transmission member 52, the first transmission member 53, the second transmission member 54) includes the first transmission member (53) and the second transmission member (54) separately provided from each other and disposed in an axial direction of the rotary axis (X) of the transmission member (the transmission member 52, the first transmission member 53, the second transmission member 54). The magnetic body portion (55) provided at the first transmission member (53) is displaced from the magnetic body portion (56) provided at the second transmission member (54) in the rotary direction (R) of the transmission member (the transmission member 52, the first transmission member 53, the second transmission member 54) during the rotation of the transmission member (the transmission member 52, the first transmission member 53, the second transmission member 54).

According to the aforementioned embodiment, each of the plural transmission members 52 is displaced from each other in the rotary direction R so that resistance generated by the magnetic force may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A resistance generating device for a drive unit opening and closing an opening and closing member of a vehicle, comprising:
a rotary body being rotated for opening and closing the opening and closing member;
a transmission member being rotated in response to an applied power, the transmission member transmitting a rotary motion to the rotary body; and
a fixing member provided to form a clearance between the fixing member and the transmission member in a radial direction of a rotary axis of the transmission member, the fixing member surrounding a periphery of the transmission member; wherein
one of the fixing member and the transmission member includes a magnet and the other of the fixing member and the transmission member includes a magnetic body;
the magnet is disposed to face the magnetic body so that a facing position of the magnet and the magnetic body facing each other is changed as the transmission member rotates; the magnet is disposed to face the magnetic body so that magnetic poles at the facing position of the magnet and the magnetic body alternate as the transmission member rotates;
the magnetic body and the magnet generate a magnetic force therebetween, the magnetic force generating a resistance against an opening and closing movement of the opening and closing member; and
the transmission member is connected to a reduction gear and receives a drive force of a motor via the reduction gear.

2. The resistance generating device according to claim 1, wherein the transmission member includes a plurality of magnetic body portions disposed at an outer peripheral portion of the transmission member, the plurality of magnetic body portions extending in a circumferential direction of the transmission member.

3. The resistance generating device according to claim 2, wherein the transmission member includes a holding portion which is a non-magnetic body, the holding portion holding the plurality of magnetic body portions.

4. The resistance generating device according to claim 1, wherein the fixing member is formed in a ring shape, the fixing member is a ring magnet of which magnetic poles alternate in a circumferential direction of the ring magnet.

5. The resistance generating device according to claim 1, wherein the opening and closing member is a back door of the vehicle and the rotary body is a threaded spindle for opening and closing the back door.

6. A resistance generating device for a drive unit opening and closing an opening and closing member of a vehicle, comprising:
a rotary body being rotated for opening and closing the opening and closing member;
a transmission member being rotated in response to an applied power, the transmission member transmitting a rotary motion to the rotary body; and
a fixing member provided to form a clearance between the fixing member and the transmission member in a radial direction of a rotary axis of the transmission member, the fixing member surrounding a periphery of the transmission member; wherein
one of the fixing member and the transmission member includes a magnet and the other of the fixing member and the transmission member includes a magnetic body;
the magnet is disposed to face the magnetic body so that a facing position of the magnet and the magnetic body facing each other is changed as the transmission member rotates;
the magnet is disposed to face the magnetic body so that magnetic poles at the facing position of the magnet and the magnetic body alternate as the transmission member rotates;
the magnetic body and the magnet generate a magnetic force therebetween, the magnetic force generating a resistance against an opening and closing movement of the opening and closing member;
the transmission member includes a plurality of magnetic body portions disposed at an outer peripheral portion of the transmission member, the plurality of magnetic body portions extending in a circumferential direction of the transmission member;
the transmission member includes a first transmission member and a second transmission member separately provided from each other and disposed in an axial direction of the rotary axis of the transmission member; and
the magnetic body portion provided at the first transmission member is displaced from the magnetic body portion provided at the second transmission member in a rotary direction of the transmission member during a rotation of the transmission member.

* * * * *